(12) United States Patent
Noice

(10) Patent No.: US 11,908,329 B2
(45) Date of Patent: Feb. 20, 2024

(54) UNUSUAL ATTITUDE RECOVERY SYMBOLOGY

(71) Applicant: Rockwell Collins, Inc., Cedar Rapids, IA (US)

(72) Inventor: Lenard E Noice, West Line, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 413 days.

(21) Appl. No.: 17/212,504

(22) Filed: Mar. 25, 2021

(65) Prior Publication Data

US 2022/0309929 A1 Sep. 29, 2022

(51) Int. Cl.
*G08G 5/00* (2006.01)

(52) U.S. Cl.
CPC .................. *G08G 5/0017* (2013.01)

(58) Field of Classification Search
CPC .. G08G 5/0017; G08G 5/0021; G08G 5/0052; G01C 23/00
See application file for complete search history.

(56) References Cited

U.S. PATENT DOCUMENTS

| | | | |
|---|---|---|---|
| 6,567,014 B1 | 5/2003 | Hansen et al. | |
| 7,403,133 B2 | 7/2008 | He et al. | |
| 7,418,318 B2 | 8/2008 | Hrabak et al. | |
| 9,057,627 B2 | 6/2015 | Shaw | |
| 9,069,163 B2 | 6/2015 | Schön | |
| 9,969,503 B2 | 5/2018 | Noice | |
| 10,216,471 B1 | 2/2019 | He et al. | |
| 10,464,688 B2 | 11/2019 | Monvoisin et al. | |
| 2011/0171612 A1* | 7/2011 | Gelinske | G09B 9/08 434/35 |
| 2011/0205090 A1* | 8/2011 | Marstall | G01C 23/005 340/975 |
| 2015/0281596 A1 | 10/2015 | Reed | |
| 2018/0022469 A1* | 1/2018 | Noice | B64D 43/02 345/520 |

FOREIGN PATENT DOCUMENTS

EP 3444570 A1 2/2019

OTHER PUBLICATIONS

Partial European Search Report in International Application No. 22159811.3 dated Aug. 15, 2022, 12 pages.

(Continued)

*Primary Examiner* — Joseph H Feild
*Assistant Examiner* — Sharmin Akhter
(74) *Attorney, Agent, or Firm* — Suiter Swantz pc llo

(57) ABSTRACT

A system and related methods for providing unusual attitude symbology for recovering from an unusual attitude condition. By the unusual attitude symbology, a pilot may visually determine corrective actions needed to recover from the unusual attitude condition with a minimal recovery time and similarly with a minimal cognitive workload. The pilot may thus establish stable flight, even under a high-stress situation. The unusual attitude symbology includes pitch direction indicators, roll direction indicators, a roll recovery arc, an unusual attitude warning indicator, and a roll entry chevron. Path based symbology may also be used to provide unusual attitude recovery while maintaining spatial orientation of the aircraft to the outside scene.

14 Claims, 7 Drawing Sheets

(56) References Cited

OTHER PUBLICATIONS

Jenkins, Joseph C., "Arc Segment Attitude Reference (ASAR) Head-Up Display (HUD) Symbology as a Primary Flight Reference Test and Evaluation", AFFTC-TR-06-06, Jan. 2008, Technical Report, https://pdfs.semanticscholar.org/5072/14376e5988385f9822fd255c08b05284a23e.pdf?Lga=2.21806335.573713718.1612387514-725608885.1588200404, 70 pages.
Extended Search Report in European Application No. 22159811.3 dated Nov. 2, 2022, 13 pages.

* cited by examiner

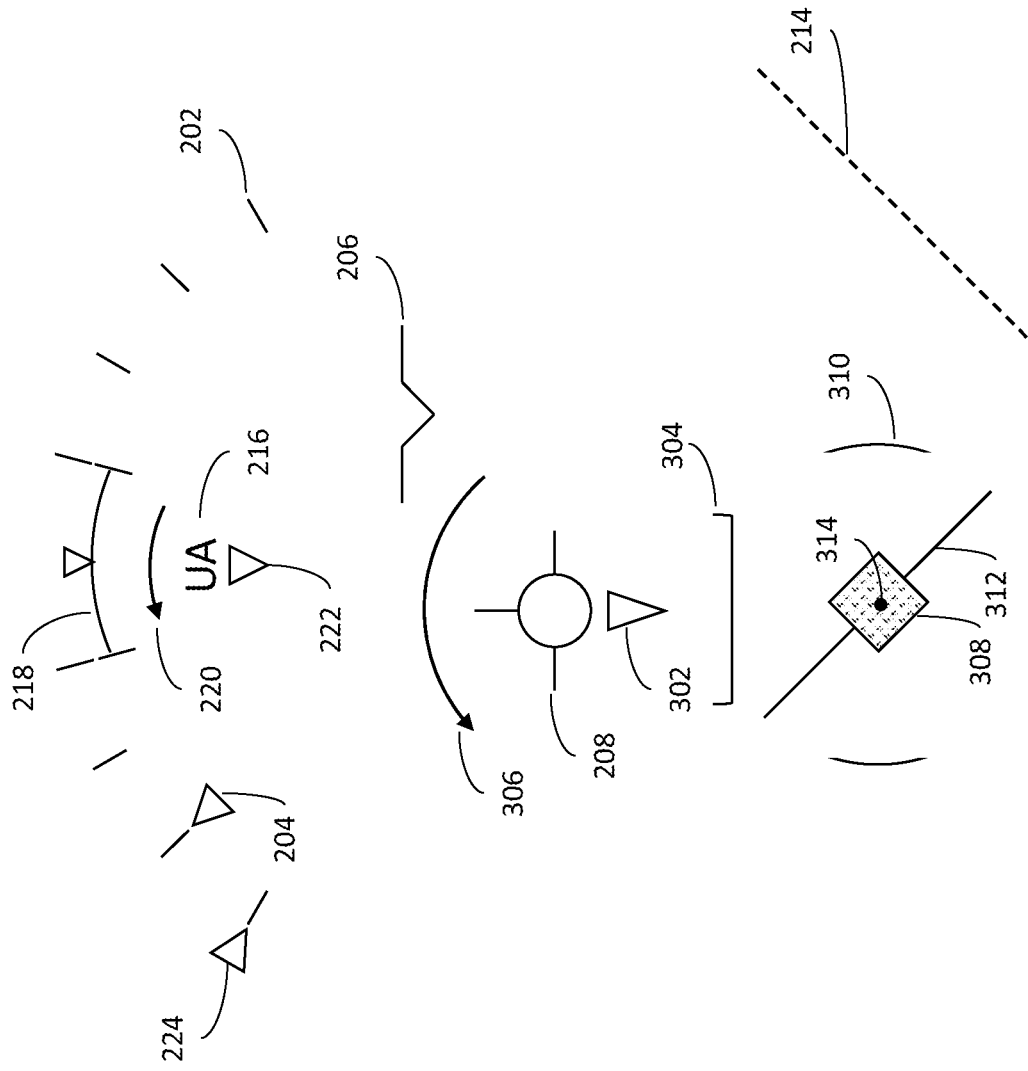

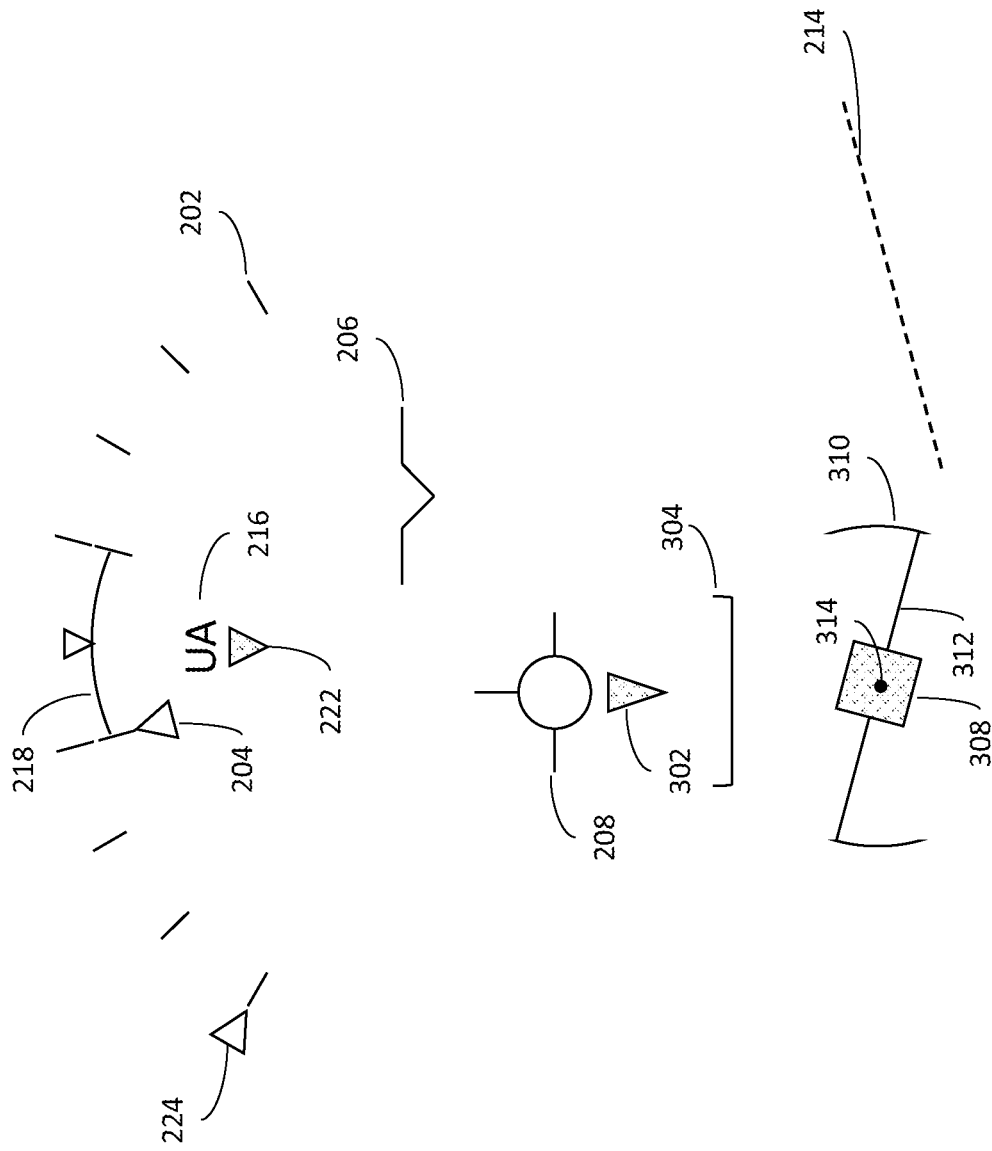

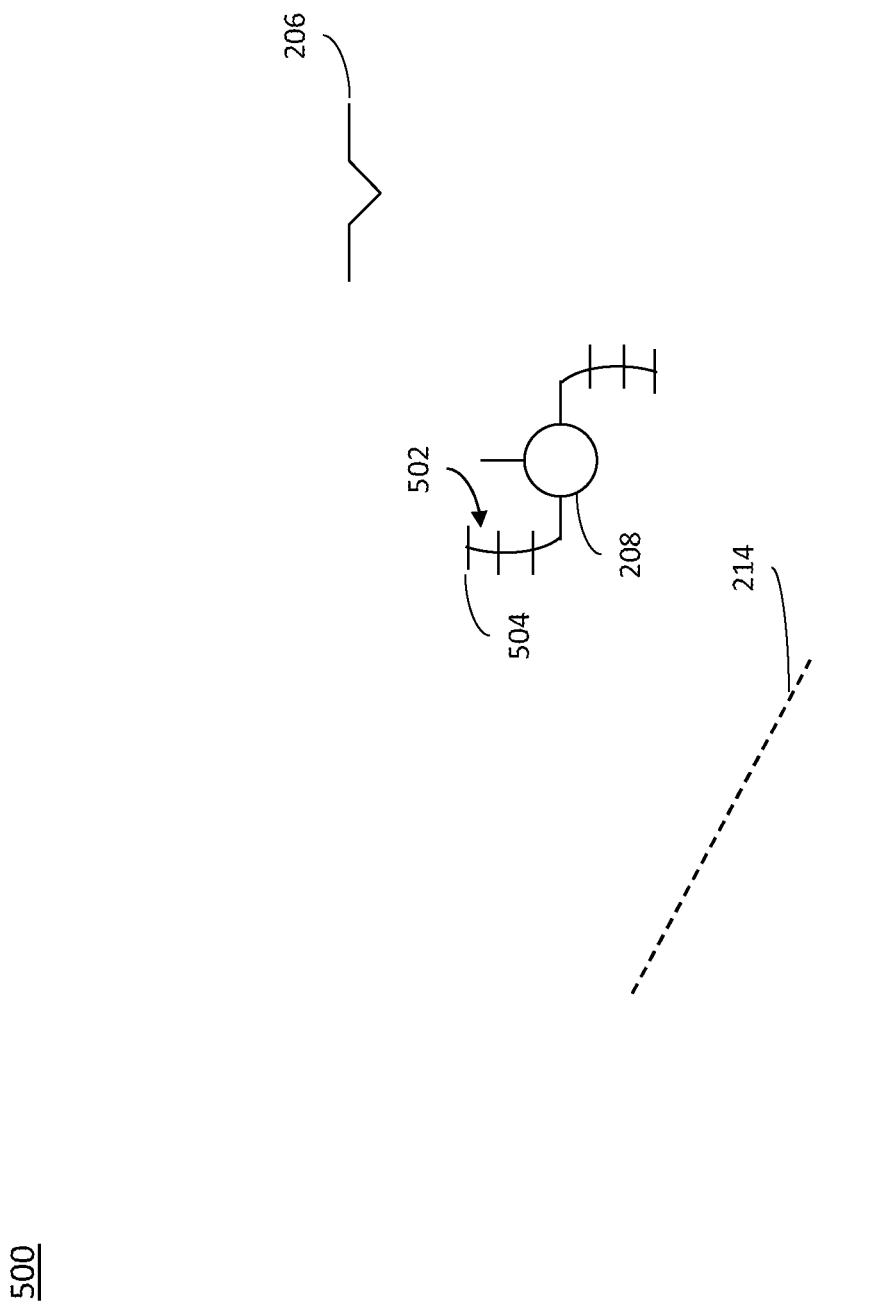

UNUSUAL ATTITUDE RECOVERY SYMBOLOGY

BACKGROUND

Human factors in aviation is an important consideration to regulators and in design of displays. For example, 14 CFR 25.1302 provides for regulation of Installed systems and equipment for use by a flight crew. One concern with flight displays is reducing pilot spatial disorientation during unusual attitude conditions. Unusual attitude displays may lack conformality with an outside scene as seen through a heads-up display. Additionally, unusual attitude displays may undergo changes from a normal attitude representation (e.g., the unusual attitude displays may be represented as an unusual attitude ball). In this regard, the display may lack consistency between normal and unusual attitude display. Therefore, it would be advantageous to provide one or more of a device, system, or method that cures the shortcomings described above.

SUMMARY

Embodiments of the present disclosure are directed to a system for providing unusual attitude recovery symbology. In one illustrative embodiment, the system includes an avionics display element. The avionics display element may display an image associated with an aircraft. The image may include a roll scale, a roll pointer symbol, and a boresight symbol. In another illustrative embodiment, the image also includes a flight path vector. The system includes a controller coupled to the avionics display element. In The controller includes a processor to perform various operations by executing program instructions maintained on a memory of the controller. The processor is configured to determine an entry of the aircraft into an unusual attitude condition. In another illustrative embodiment, the unusual attitude condition includes an unusual roll condition based on a roll of the aircraft. In another illustrative embodiment, the unusual attitude condition includes an unusual pitch condition based on a pitch of the aircraft. The processor may be further configured to update the image in response to determining the entry of the aircraft to the unusual attitude condition.

In another illustrative embodiment, the updated image includes unusual attitude symbology displayed relative to the roll scale. The unusual attitude symbology displayed relative to the roll scale includes an unusual attitude warning indicator and a roll recovery arc.

In another illustrative embodiment, the updated image includes unusual attitude symbology displayed relative to the flight path vector. In another illustrative embodiment, the unusual attitude symbology displayed relative to the flight path vector includes a pitch direction indicator and a roll direction indicator.

In another illustrative embodiment, prior to updating the image in response to determining the entry of the aircraft to the unusual attitude condition, the image is updated to include a roll entry chevron on the roll scale.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 4A-4C depicts symbology displayed by a system of FIG. 1, in accordance with one or more embodiments of the present disclosure.

FIG. 5 depicts symbology displayed by a system, in accordance with one or more embodiments of the present disclosure.

DETAILED DESCRIPTION OF EXEMPLARY EMBODIMENTS

Figure 1:
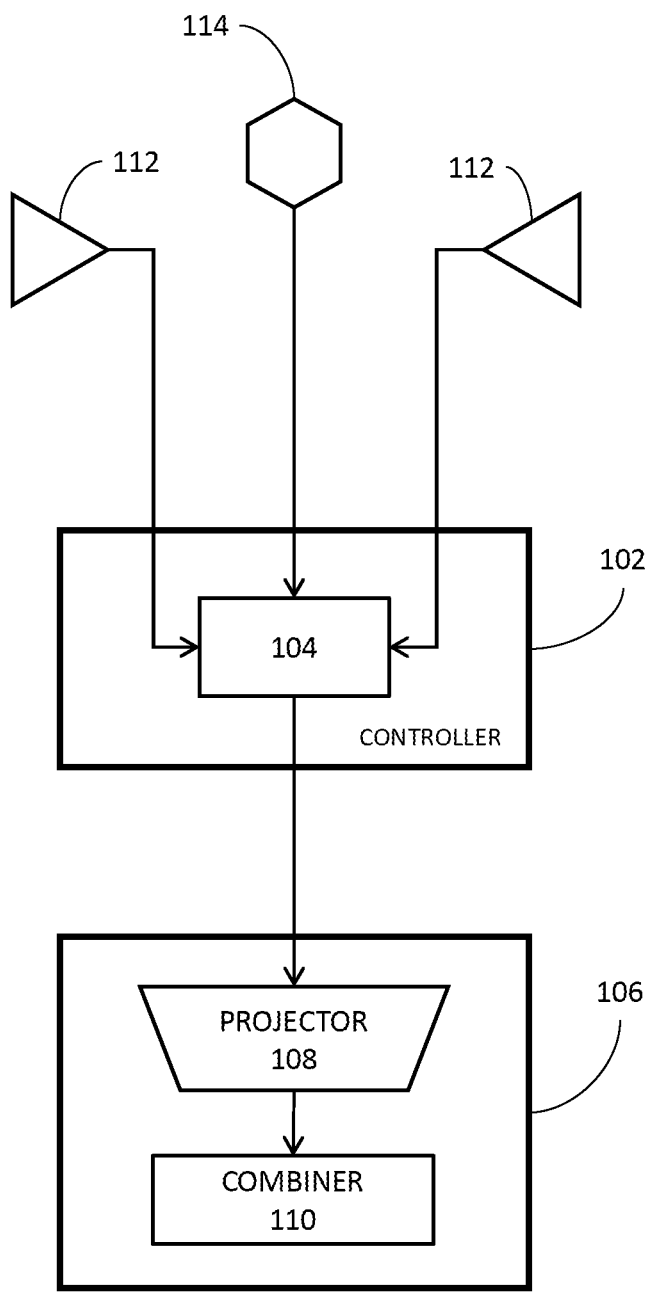
FIG. 1 depicts a block diagram of a system, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the concepts disclosed herein are directed generally to a system for providing unusual attitude recovery guidance to an aircraft pilot or crew via symbology displayed via a primary flight display (PFD) or head-down display (HDD), a head-up display (HUD), a head-mounted display (HMD), a stand-by display, or a head-worn display (HWD). The unusual attitude recovery symbology may enable path-based recovery from the unusual attitude condition, while maintaining a flight path vector on a display during the unusual attitude condition. Pitch correction symbology or roll correction symbology may be displayed in response to the detected changes in pitch attitude or detected change in roll attitudes. As will be appreciated, the symbology described herein may provide for enhanced situational awareness and simplified guidance for quickly and efficiently taking steps to recover aircraft of all sizes and configurations from unusual attitude. Unusual attitude roll entry avoidance symbology may also be displayed, the roll entry avoidance displayed to help avoid entry into the unusual attitude condition.

Display symbology is generally described in U.S. Pat. No. 6,567,014, by Richard Hansen et. al; and U.S. Pat. No. 9,969,503, by Lenard Noice; both of which are incorporated herein by reference in its entirety.

Referring to FIG. 1, a system is depicted, in accordance with one or more embodiments of the present disclosure.

An exemplary embodiment of a system 100 for providing unusual attitude recovery symbology according to the inventive concepts disclosed herein may include a controller 102, the controller 102 including one or more processors 104, and a display element 106, the display element 106 including a projector 108 (or similar display module) and a combiner 110 (or similar display surface). The controller 102 may be communicatively coupled to one or more aircraft sensors 112 or avionics systems 114 of an aircraft in which the system 100 is embodied. Similarly, the controller 102 may include the one or more aircraft sensors 112 (e.g., where the display element 106 is embodied as a stand-by instrument). The display element 106 may be a primary flight display (PFD), a head-down display (HDD), a head-up display (HUD), a head-mounted display (HMD), a stand-by instrument, or a head-worn display (HWD). The display element 106 may be configured to display fully or partially immersive imagery corresponding to the environment surrounding the aircraft. The display element 106 may include graphics processors (e.g., a synthetic vision system (SVS)) for generating explanatory symbology related to the environment and merging the symbology with the imagery to generate a combined vision stream displayed via the combiner 110. The processors 104 of the controller 102 may generate some or all of the symbology of a combined vision stream.

Based on data collected from the aircraft sensors 112 or avionics systems 114, the controller 102 may determine that the aircraft is in an unusual attitude condition. For example, the unusual attitude condition may be determined based on a pitch or a roll of the aircraft. Such pitch or roll may be determined by one or more of the aircraft sensors 112 or the avionics systems 114. Various unusual attitude recovery symbology may then be displayed on the display element 106, by a communicative coupling between the controller 102 and the display element 106. As may be understood, the system 100 is not intended to be limited to a specific unusual attitude entry condition. In this regard, the roll or pitch at which the unusual attitude condition may be entered will depend on a configuration of the aircraft in which the system 100 is installed.

Figure 2:
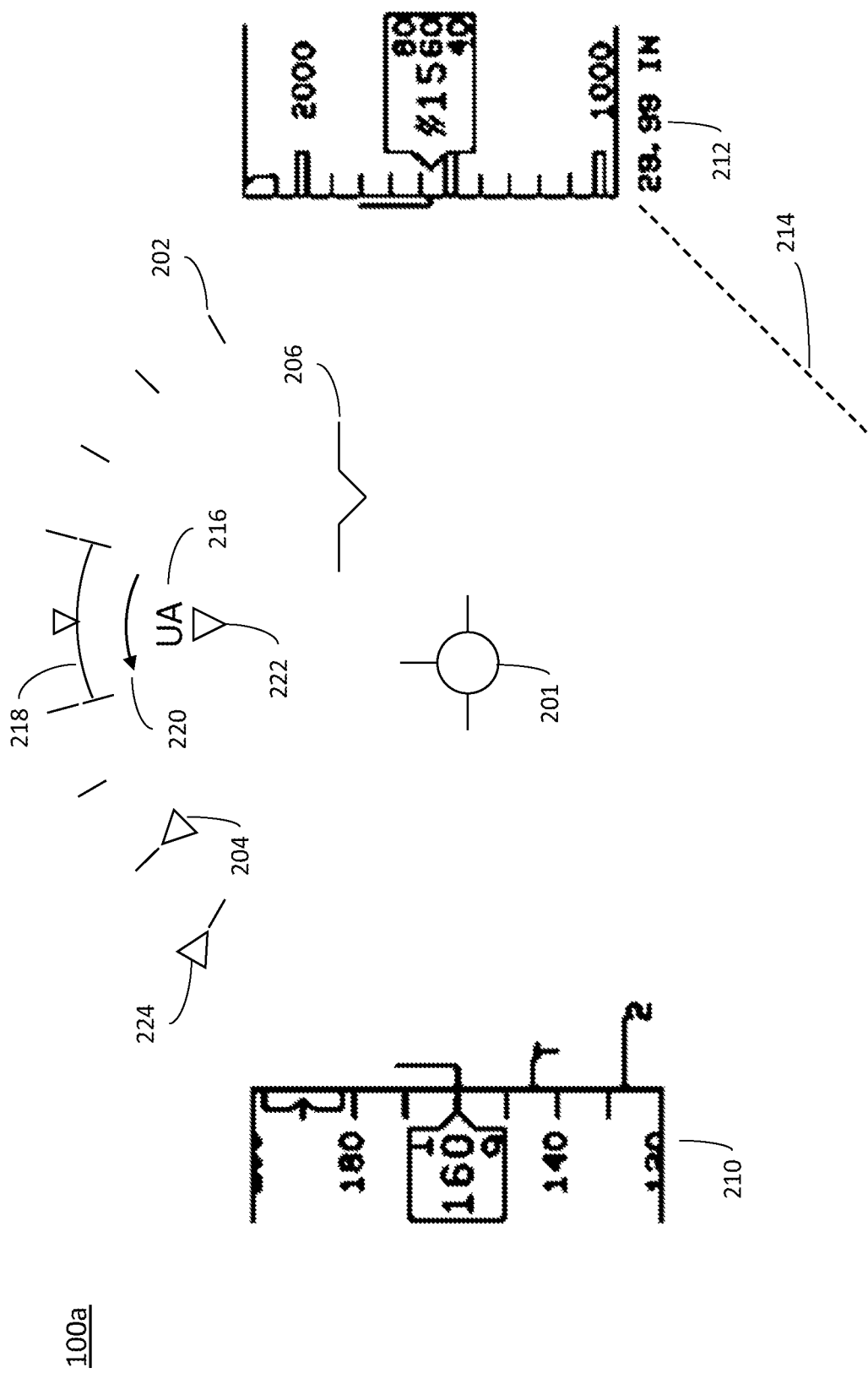
FIG. 2 depicts symbology displayed by a system, in accordance with one or more embodiments of the present disclosure.

Referring to FIG. 2, an exemplary embodiment of a system 100a for providing unusual attitude recovery symbology may be implemented identically to the system 100 of FIG. 1, except that when an unusual attitude condition is detected by the controller 102 (FIG. 1), the system 100a may generate unusual attitude symbology on the display surface.

Embodiments of the present disclosure are related to unusual attitude symbology. The unusual attitude symbology may be displayed relative to a roll scale 202. The roll scale 202 remains positioned statically on the display element 106 (e.g., in an upper position). By displaying the unusual attitude symbology relative to the roll scale 202, a pilot may visually determine the state of the aircraft with a reduced scan time (e.g., because of the static position). In this regard, as the pilot adjusts a roll of the aircraft, a roll pointer 204 may be moved about the roll scale 202. By the unusual attitude symbology, the pilot may refer to the roll scale 202 to visually determine corrective actions needed to exit an unusual attitude condition.

For example, during normal operating conditions the system 100a may display an image on the display surface. The image may include the roll scale 202 and the roll pointer 204 indicative of a roll of the aircraft, a boresight symbol 206, and a flight path vector 208 of the aircraft. As may be understood, the system 100a is not intended to be limited to such display, and may further include a variety of information, such as, but not limited to, an airspeed indicator 210, an altitude indicator 212, and a horizon 214. The boresight symbol 206 may provide a longitudinal axis of the aircraft attitude from which various symbology (e.g., a pitch scale, the flight path vector 208, the horizon 214, etc.) is referenced. The flight path vector 208 may provide a projected path of the aircraft. The pitch scale and the roll scale 202 may provide an attitude of the aircraft.

Upon detecting an entry of the aircraft into the unusual attitude condition (e.g., an unusual roll condition; an unusual pitch condition; both an unusual roll condition and an unusual pitch condition), the controller may update the image displayed on the display element 106. The updated image may include various unusual attitude symbology which is maintained relative to the roll scale 202, such as, but not limited to, an unusual attitude warning indicator 216, a roll recovery arc 218, a roll direction indicator 220, and a pitch direction indicator 222. The unusual attitude symbology may be referenced off the aircraft attitude (e.g., as represented by the boresight symbol 206).

The unusual attitude warning indicator 216 may include annunciations, such as, but not limited to, UA, Unusual Attitude, Roll, or Pitch. By the unusual attitude warning indicator 216, a pilot may visually determine the aircraft is in an unusual attitude condition. Once both the unusual roll condition and the unusual pitch condition are corrected, the unusual attitude warning indicator 216 may be removed from display element 106.

The roll recovery arc 218 may present range of roll angles in relation to the roll scale 202, by which the aircraft may recover from the unusual roll condition. Thus, a pilot may visually determine a stable roll angle for the aircraft by which the aircraft may exit the unusual attitude condition using the roll recovery arc 218. For example, the pilot may visually determine a difference between a current position of the roll pointer 204 and the roll recovery arc 218, and based on the visual determination, may adjust the roll pointer 204 within the roll recovery arc 218. The range of the roll recovery arc 218 may be selected based on the aircraft. For example, FIG. 2 depicts the roll recovery arc 218 as extending from fifteen degrees from level, although this is not intended to be limiting. In embodiments, the roll recovery arc 218 may include color information indicative of a status of the roll of the aircraft. For example, the roll recovery arc 218 may be a first color (e.g., a red color) indicating an unusual roll condition. When the roll is corrected with the roll recovery arc 218, the roll recovery arc 218 may be updated with a second color (e.g., a green or blue color) indicating a roll recovery.

The roll direction indicator 220 may indicate a direction of corrective roll by which the aircraft may exit the unusual attitude condition. When the roll of the aircraft comes within the roll recovery arc 218, the roll direction indicator 220 may be removed, indicating the aircraft has achieved an acceptable roll. The roll direction indicator 220 may be removed after a delay, to prevent pilot disorientation, as will be described further herein. In some embodiments, the roll direction indicator 220 may be displayed above the unusual attitude warning indicator 216 and below the roll scale 202.

The pitch direction indicator 222 may be displayed if the aircraft is undergoing an unusual pitch condition. The pitch direction indicator 222 may include a shape. For example, the shape of the pitch direction indicator 222 may include a triangle. The triangle-shaped pitch direction indicator 222 may be pointed in a direction, corresponding to a pitch direction to recover the aircraft from the UA pitch condition. For example, where the triangle points upwards, a pilot may visually determine the aircraft needs to pitch upwards to recover from the unusual pitch condition. When the pilot has achieved a target pitch attitude, the pitch direction indicator 222 may be removed from the image updated on the display element 106, indicating the aircraft has achieved an acceptable pitch. The pitch direction indicator 222 may be removed after a delay, to prevent pilot disorientation, as will be described further herein. In some embodiments, the pitch direction indicator 222 is displayed below the unusual attitude warning indicator 216.

In embodiments, the controller 102 is configured to emphasize or de-emphasize various unusual attitude symbology. For example, where the display element 106 is embodied by a device including a color display, the unusual attitude symbology may be emphasized by changing a color of the various unusual attitude symbology (e.g., changing to a red color) and de-emphasize by changing the color (e.g., changing to an amber color). By way of another example, the controller 102 may be configured to emphasize the unusual attitude symbology by changing the fill (e.g., changing to a solid fill, cross-hatch, etc.) and de-emphasize the unusual attitude symbology by changing the fill (e.g., changing to a hollow fill). By way of another example, the controller 102 may be configured to emphasize the unusual attitude symbology by flashing the unusual attitude symbology. By way of another example, the controller 102 may be configured to emphasize the unusual attitude symbology by increasing a brightness of the unusual attitude symbology or decreasing a brightness of surrounding symbology. By way of another example, the controller 102 may be configured to emphasize the unusual attitude symbology by increasing a line weight and may be configured to de-emphasize the unusual attitude symbology by decreasing a line weight.

In embodiments, the pitch direction indicator 222 may be emphasized (e.g., by a color, a fill type, a flashing, brightness, a line weight, etc.) when a pitch is trending in a wrong direction or otherwise needs immediate correction. If the aircraft does not have enough speed and pitching up would exaggerate the issue, the unusual attitude symbology may provide the operator with conflicting information. For example, if the pitch attitude may lead to a stall condition, the pitch direction indicator 222 may be de-emphasized. While the stall information is displayed, the pitch direction indicator 222 may include a color (e.g., amber) or a hollow shape fill to de-emphasize pitch correction. If the system has determined there is enough margin to correct for pitch, the pitch direction indicator 222 may be emphasized. For example, the pitch direction indicator 222 may include a different color (e.g., red) or a solid fill to indicate a pitch correction is needed.

In the event of an unusual pitch condition but no unusual roll condition (or where the unusual roll condition has been recovered), the pitch direction indicator 222 may be emphasized (e.g., by a color, a fill type, a flashing, brightness, a line weight, etc.). By the emphasis, a pilot may determine a present step of correcting pitch to get out of the unusual pitch condition. This may be advantageous in complying with current standard operating procedures of correcting for roll and then correcting for pitch.

In embodiments, the controller 102 is further configured to update the unusual attitude symbology in response to determining the exit of the aircraft from the unusual attitude condition. For example, the controller may update the unusual attitude symbology after a pre-determined delay. By updating the unusual attitude symbology after the pre-determined delay, pilot disorientation may be reduced. In this regard, should the aircraft rapidly enter and exit the unusual attitude condition, one or more of the roll recovery arc 218, the unusual attitude warning indicator 216, the roll direction indicator 220, or the pitch direction indicator 222 may remain displayed. The pre-determined delay may be any suitable amount of time, such as, but not limited to, one-half of a second or more.

In embodiments, an unusual attitude roll entry chevron 224 may be displayed prior to entering the unusual attitude condition. The unusual attitude roll entry chevron 224 may indicate a roll angle at which point a system may transition to the unusual attitude display. The system may transition into the unusual attitude display when the roll pointer intersects the unusual attitude roll entry chevron 224. By the unusual attitude roll entry chevron 224, a pilot may avoid the unusual attitude condition based on the roll pointer 204.

Figure 3:
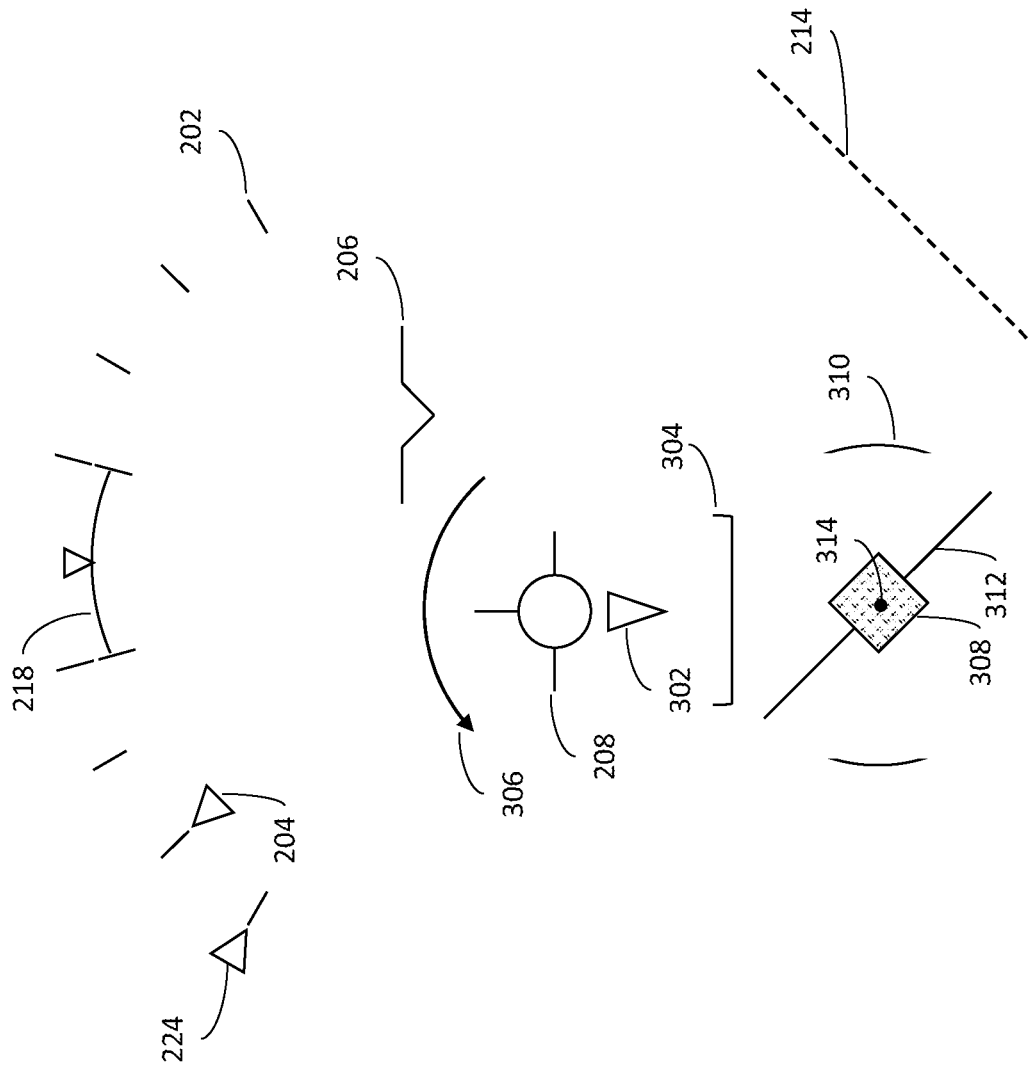
FIG. 3 depicts symbology displayed by a system, in accordance with one or more embodiments of the present disclosure.

Referring now to FIG. 3, an exemplary embodiment of a system 100b for providing unusual attitude recovery symbology may be implemented identically to the system 100 of FIG. 1, except that when an unusual attitude condition is detected by the controller 102 (FIG. 1), the system 100b may generate unusual attitude symbology on the display element 106.

Embodiments of the present disclosure are related to unusual attitude recovery symbology. The various unusual attitude recovery symbology described may maintain a position relative to the flight path vector 208. The flight path vector 208 dynamically moves about the display element 106, to show the predicted flight path. By maintaining the path-based unusual attitude recovery symbology in the position relative to the flight path vector 208, a pilot may visually determine the state of the aircraft with a reduced scan time from the flight path vector 208 and maintain spatial orientation. In this regard, as the pilot adjusts a roll or a pitch of the aircraft, the flight path vector 208 may be correspondingly adjusted to indicate a flight path of the aircraft. The unusual attitude recovery symbology may be displayed relative to such flight path vector 208. This may be advantageous during the unusual attitude condition when the pilot is referencing the flight path vector 208, because time is a key factor in safely exiting the unusual attitude condition.

The unusual attitude recovery symbology may include a pitch direction indicator 302. The pitch direction indicator 302 may be identical to the pitch direction indicator 222, except that the pitch direction indicator 302 may remain fixed relative to the flight path vector 208. In this regard, the pitch direction indicator 302 may be visible by the pilot, without regard to a pitch or a roll of the aircraft, even if, for example, the horizon 214 is no longer conformal with the outside scene. Thus, the pitch direction indicator 302 may provide situational awareness of a direction to pitch the aircraft so that the pilot may pitch the aircraft back to stable flight (e.g., towards the horizon or a zero pitch line). The pitch direction indicator 302 may be displayed if the aircraft is undergoing an unusual pitch condition. The pitch direction indicator 302 may include a shape that corresponds to a direction in which the aircraft should be pitched to recover from the unusual pitch condition. For example, the shape of the pitch direction indicator 302 may include a triangle. The triangle-shaped pitch direction indicator 302 may be pointed in a direction. For example, where the triangle points upwards, a pilot may visually determine the aircraft needs to pitch upwards to recover from the unusual pitch condition. In some embodiments, the pitch direction indicator 302 is disposed below the flight path vector 208.

In embodiments, the unusual attitude recovery symbology may include a roll direction indicator 306. The roll direction indicator 306 may be identical to the roll direction indicator 220, except that the roll direction indicator 306 may remain fixed relative to the flight path vector 208. In some embodiments, the roll direction indicator 306 is disposed above the flight path vector 208.

In embodiments, a flight director guidance cue 308 may be displayed during an unusual attitude condition. The flight director guidance cue 308 may include a shape different from a flight director guidance cue used during normal operating conditions. For example, the flight director guidance cue 308 may include a square, diamond, or rectangle. The shape of the flight director guidance cue 308 may have a size such that the flight director guidance cue 308 may be contained with the flight path vector 208. In this regard, the pilot may adjust the pitch and roll of the aircraft until the flight path vector 208 is contained within the flight director guidance cue 308.

The flight director guidance cue 308 may also include a pitch reference point 314 in a center of the flight director guidance cue 308. By the pitch reference point 314, the pilot may visually determine when the pitch of the aircraft is within a pitch guide 304, such that an unusual pitch condition may be corrected (e.g., bring the nose level). In embodiments, the pitch guide 304 may also be displayed. The pitch guide 304 indicates a pitch at which the aircraft may recover from the unusual pitch condition. When the pitch reference point 314 of the flight director guidance cue 308 is beyond the pitch guide 304, the flight director guidance cue 308 may be emphasized (e.g., by a color, a fill type, a flashing, brightness, a line weight, etc.) until the pitch reference point 314 crosses the pitch guide 304. When the pitch reference point of the flight director guidance cue 308 is within a boundary of the pitch guide 304, the unusual pitch condition may be corrected. Thus, a pilot may visually determine an amount of pitch needed by which to correct the unusual pitch condition. The boundary of the pitch guide 304 may be represented as a bracket. The pitch guide 304 may be positioned at a pitch value where the aircraft is determined to be at a recoverable pitch state. The pitch guide 304 may be located above or below the flight path vector 208, depending on the direction of pitch recovery (e.g., located above when the aircraft needs to pitch downwards; located below when the aircraft needs to pitch upwards).

The flight director guidance cue may also include arms 312 that are oriented to allow the pilot to correct the roll angle of the aircraft. In this regard, the arms 312 may be inverse to a current roll angle of the aircraft. In embodiments, the path-based UA recovery symbology may also include a roll guide 310. The roll guide 310 may display a range of roll angles at which the aircraft may recover from the unusual roll condition. When the arms 312 of the flight director guidance cue 308 are within a boundary of the roll guide 310, the unusual roll condition may be in an acceptable range of roll recovery. The arms 312 may have a width, such that the arms 312 extend to the roll guide 310. Thus, the arms 312 and the roll guide 310 may provide the pilot visual representation of roll needed to bring the aircraft level. The roll guide 310 may remain fixed relative to a center of the flight director guidance cue 308. The boundary of the roll guide 310 may be represented as a portion of a circle or a portion of an ellipse. Similar to the roll recovery arc 218, an arc-length of boundary of the roll guide 310 may be based at least in part on an acceptable roll condition of the aircraft.

Once the aircraft has achieved the target pitch and roll, the controller 102 may determine that the aircraft has achieved stable flight. Accordingly, the system 100b may transition into normal symbology by removing the various unusual attitude symbology. The flight director guidance cue 308 may also transform into a conventional flight director.

Figure 4C:
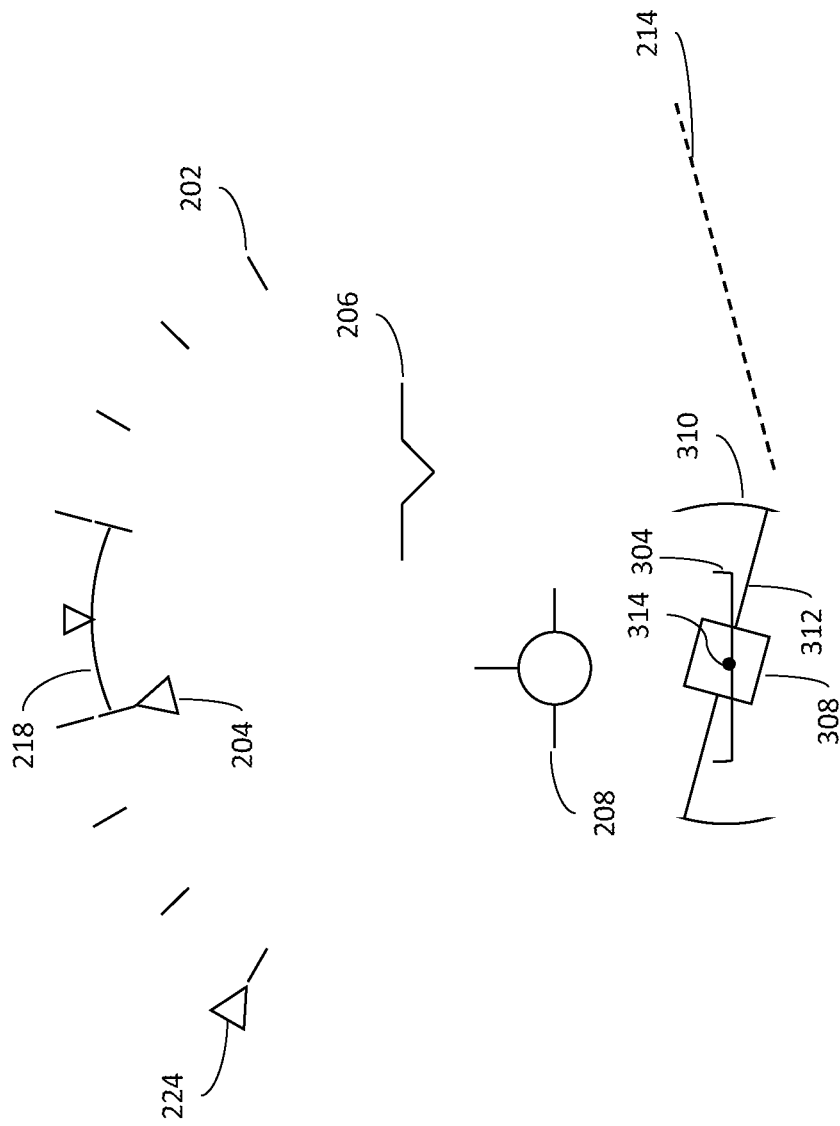

Referring now to FIGS. 4A-4C, an exemplary embodiment of the system 100c for providing unusual attitude recovery symbology. The system 100c may include various symbology discussed in regard to the system 100a and the system 100b. For example, the system 100c may include the roll scale 202, the roll pointer 204, the boresight symbol 206, the flight path vector 208, the airspeed indicator 210 (see FIG. 2), the altitude indicator (see FIG. 2), the horizon 214, the unusual attitude warning indicator 216, the roll direction indicator 220, the pitch direction indicator 222, the pitch direction indicator 302, the pitch guide 304, the roll direction indicator 306, the flight director guidance cue 308, the roll guide 310, the arms 312, and the pitch reference point 314.

In embodiments, a standard operating procedure for correcting an unusual attitude condition may be for the pilot to correct for roll and then to correct for pitch. The image displayed by the display element 106 may include indicators such that the pilot may first correct for roll and then correct for pitch. In this regard, the flight director guidance cue 308 may be emphasized (e.g., by a color, a fill type, a flashing, brightness, a line weight, etc.) and the pitch direction indicator 302 may be de-emphasized until the unusual roll condition is corrected. For example, the flight director guidance cue 308 may be emphasized by a solid fill or a color and de-emphasized by a hollow fill or a color. The emphasis of the flight director guidance cue 308 may highlight the roll for the pilot's attention for immediate correction. The roll direction indicator 220 and the roll direction indicator 306 may then highlight a direction in which to roll when roll correction is a primary command. A difference between the roll pointer 204 and the roll recovery arc 218 may indicate an amount of roll required to exit the unusual roll condition. Similarly, a difference between the roll guide 310 and the arms 312 may indicate an amount of roll required to exit the unusual roll condition.

Referring now to FIG. 4B, the aircraft has exited or otherwise corrected the unusual roll condition (as depicted by the roll pointer 204 and the roll recovery arc; as depicted by the arms 312 and the roll guide 310) such that pitch correction is not a primary command. Upon exiting the unusual roll condition, the roll direction indicator 220 and the roll direction indicator 306 may be removed from the image. Additionally, the pitch direction indicator 222 and the pitch direction indicator 302 may be de-emphasized. The emphasis of the pitch direction indicator 222 and the pitch direction indicator 302 may highlight the pitch direction for the pilot's immediate attention. Similarly, a difference between the pitch guide 304 and the pitch reference point 314 may indicate an amount of pitch required to exit the unusual pitch condition.

Referring now to FIG. 4C, the aircraft has exited the unusual pitch condition (as depicted by the pitch guides 304 and the pitch reference point 314). Upon exiting the unusual pitch condition, the unusual attitude warning indicator 216, the pitch direction indicator 222, and the pitch direction indicator 302 may be removed from the image. Additionally, the flight director guidance cue 308 may be de-emphasized. By the de-emphasized flight director guidance cue 308, the pilot may visually determine that the unusual attitude condition has been exited. The roll recovery arc 218 and the flight director guidance cue 308 may then remain displayed for a pre-determined delay before being removed from the image, in accordance with one or more embodiments of the present disclosure.

Referring now to FIG. 5, a system 500 is described in accordance with one or more embodiments of the present disclosure.

The unusual attitude roll direction indication may be represented on the flight path vector 208 by a roll error tape 502. The roll error tape 502 may be displayed when the aircraft is experiencing an unusual roll condition. The roll error tape 502 may include may include an arc extending from one or more tips of the flight path vector 208 (e.g., where the tip is representative of a wing of the aircraft). For example, the roll error tape 502 may include two arcs extending from the tips of the flight path vector 208, where each of the two arcs are in either a clockwise or counter-clockwise orientation. In this regard, the orientation of the two arcs may represent a direction in which to roll the aircraft to correct for the unusual roll condition. The roll error tape 502 may also include one or more tic marks 504, the tic mark 504 representative of a degree of roll. For example, the roll error tape 502 may include the tic mark 504 for every five degrees, up to or greater than fifteen degrees. The roll error tape 502 may also be displayed on various other symbology, such as, but not limited to, the boresight symbol 206.

Referring generally again to FIGS. 1-5.

In embodiments, video (e.g., enhanced vision system (EVS), synthetic vision system (SVS), combined vision system (CVS), or enhanced flight vision system (EFVS)) may remain displayed by the display element 106 during the unusual attitude condition. The video may remain displayed because the display format remains conformal between normal attitude and unusual attitude conditions. The video may provide the pilot with additional situational awareness of the environment in order to quickly and safely return to stabilized flight (while avoiding any obstacles).

In embodiments, the various unusual attitude symbology may be displayed via the combiner 110 or display surface as monochrome or colored symbols, depending on, e.g., whether the display element 106 (FIG. 1) is a PFD/HDD, HUD, HMD, stand-by display, or HWD. The unusual attitude symbology may be further modified according to human factors considerations. For example, various of the unusual attitude symbology may be implemented as flashing symbols, solid, and/or with a color. Furthermore, a brightness of the display element displaying the various unusual attitude symbology or the other symbology may be adjusted (either brighter or darker) to be more easily identified by the pilot. By adjusting the brightness intensity, non-critical information may be less bright on the display, while critical information is at full-brightness.

In embodiments, a v-bar or another form of a cross-bar may be provided on a head-down primary flight display during the unusual attitude condition to provide unusual attitude recovery guidance.

In embodiments, a digital representation of an amount of pitch or roll angle required to recover from an unusual attitude condition may be presented on the display element 106. The digital representation may be in addition to the various unusual attitude symbology described herein. By the digital representation, the pilot may determine a numerical amount of pitch or roll needed to correct the unusual attitude condition.

Although the various systems described herein are described as including an unusual attitude condition based on both an unusual pitch condition and an unusual attitude condition, this is not intended to be limiting. In this regard, depending on a pitch and a roll of the aircraft, the unusual attitude condition may include either the unusual pitch condition or the unusual roll condition. Similarly, the image may be updated with appropriate symbology for correcting either the unusual pitch condition or the unusual roll condition, as described herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system for providing unusual attitude recovery symbology, comprising:
   at least one avionics display element configured to display an image associated with an aircraft, the image including at least:
      a roll scale;
      a roll pointer symbol configured to move about the roll scale, the roll pointer symbol representative of a current roll of the aircraft; and
      a flight path vector; and
      a boresight symbol; and
   at least one controller coupled to the avionics display element, the controller including at least one processor configured to:

determine an entry of the aircraft into an unusual attitude condition, the unusual attitude condition including an unusual roll condition based on a roll of the aircraft; and update the image in response to determining the entry of the aircraft to the unusual attitude condition, the updated image further comprising unusual attitude symbology displayed relative to the roll scale, the unusual attitude symbology comprising:

an unusual attitude warning indicator; and a roll recovery arc presenting a range of roll angles on the roll scale at which the aircraft may recover from the unusual roll condition, such that the unusual roll condition may be recovered from by positioning the roll pointer symbol within the range of roll angles on the roll scale;

wherein the controller is further configured to update the image with a roll error tape, the roll error tape including at least one arc extending from one or more tips of the flight path vector, the at least one arc representative of a direction in which to roll the aircraft to correct for the unusual roll condition.

2. The system of claim 1, wherein prior to updating the image in response to determining the entry of the aircraft to the unusual attitude condition, the image further comprises at least one roll entry chevron on the roll scale, the roll entry chevron indicative of a roll of the aircraft at which the unusual roll condition is entered.

3. The system of claim 1, wherein the controller is further configured to:

determine a recovery of the aircraft from the unusual roll condition; and update the image by removing at least the roll recovery arc in response to determining the recovery of the aircraft from the unusual roll condition.

4. The system of claim 3, wherein the roll recovery arc is removed from the image after a pre-determined delay.

5. The system of claim 1, wherein a video is maintained conformal with the image on the avionics display element during the unusual attitude condition.

6. The system of claim 1, wherein the unusual attitude condition further comprises an unusual pitch condition based on a pitch of the aircraft, wherein the unusual attitude symbology displayed relative to the roll scale further comprises a pitch direction indicator pointing in a direction in which to pitch the aircraft to recover from the unusual pitch condition.

7. The system of claim 6, wherein the pitch direction indicator is a shape indicative of a direction in which to pitch the aircraft to correct the unusual pitch condition; wherein the pitch direction indicator is fixed relative to the roll scale.

8. The system of claim 1, wherein the controller is further configured to update the image with a roll direction indicator, the roll direction indicator pointing in a direction in which to roll the aircraft to recover from the unusual roll condition.

9. A system for providing unusual attitude recovery symbology, comprising:

at least one avionics display element configured to display an image associated with an aircraft, the image including at least:

a roll scale;

a roll pointer symbol configured to move about the roll scale, the roll pointer symbol representative of a current roll of the aircraft;

a flight path vector; and a boresight symbol; and at least one controller coupled to the avionics display element, the controller including at least one processor configured to:

determine an entry of the aircraft into an unusual attitude condition, the unusual attitude condition including an unusual roll condition based on a roll of the aircraft, the unusual attitude condition including an unusual pitch condition based on a pitch of the aircraft;

update the image in response to determining the entry of the unusual attitude condition, the updated image further comprising unusual attitude recovery symbology displayed relative to the flight path vector, the unusual attitude recovery symbology comprising:

a pitch direction indicator pointing in a direction in which to pitch the aircraft; and a roll direction indicator pointing in a direction in which to roll the aircraft;

wherein upon determining the entry of the aircraft into the unusual attitude condition, the image is further updated with:

a flight director guidance cue including a pitch reference point indicative of the pitch of the aircraft and one or more arms indicative of the roll of the aircraft;

a pitch guide configured to indicate a pitch at which the aircraft may recover from the unusual pitch condition; and a roll guide configured to indicate a range of roll angles at which the aircraft may recover from the unusual roll condition;

wherein the one or more arms extend to the roll guide; wherein the roll guide remains fixed relative to the flight director guidance cue.

10. The system of claim 9, wherein prior to updating the image in response to determining the entry of the aircraft to the unusual attitude condition, the image further comprises at least one roll entry chevron on the roll scale, the roll entry chevron indicative of a roll of the aircraft at which the unusual roll condition is entered.

11. The system of claim 9, wherein the controller is configured to:

determine a recovery of the aircraft from the unusual roll condition; and update the image by removing at least the roll direction indicator in response to determining the recovery of the aircraft from the unusual roll condition.

12. The system of claim 11, wherein the controller is configured to:

determine a recovery of the aircraft from the unusual pitch condition; and update the image by removing at least the pitch direction indicator in response to determining the recovery of the aircraft from the unusual roll condition.

13. The system of claim 9, wherein during the unusual roll condition, the flight director is emphasized, the emphasis including at least one of a color or a shape fill.

14. The system of claim 9, wherein the pitch direction indicator is a shape indicative of the direction in which to pitch the aircraft.

* * * * *